United States Patent [19]

Newton et al.

[11] Patent Number: 5,791,234

[45] Date of Patent: Aug. 11, 1998

[54] TWO-SIDED COOKING APPARATUS HAVING AN ELECTRONIC GAP ADJUSTMENT MECHANISM

[75] Inventors: Robert K. Newton, Beloit; Mark T. Erickson, Sun Prairie, both of Wis.

[73] Assignee: Taylor Company, Aurora, Ill.

[21] Appl. No.: 843,770

[22] Filed: Apr. 21, 1997

[51] Int. Cl.$^6$ .............................. A47J 27/62; A47J 37/06
[52] U.S. Cl. ................................ 99/349; 99/374; 99/379; 99/422
[58] Field of Search ............... 99/326–331, 335, 99/342–349, 375–379, 390, 391, 383, 423–426; 219/524, 525, 443; 100/93 P, 233; 126/39 H, 41 R

[56] References Cited

U.S. PATENT DOCUMENTS

| | | | |
|---|---|---|---|
| Re. 32,994 | 7/1989 | Adamson et al. | 99/332 |
| 1,031,085 | 7/1912 | Nuubson. | |
| 4,444,094 | 4/1984 | Baker et al. | |
| 4,567,819 | 2/1986 | Adamson. | |
| 4,586,428 | 5/1986 | Adamson. | |
| 4,601,237 | 7/1986 | Harter et al. | 99/349 |
| 4,627,335 | 12/1986 | Sherman et al. | |
| 4,669,373 | 6/1987 | Weimer et al. | 99/372 X |
| 4,697,504 | 10/1987 | Keating | 99/331 |
| 4,700,619 | 10/1987 | Scanlon | 99/349 |
| 4,763,571 | 8/1988 | Bergling et al. | 99/349 |
| 4,878,424 | 11/1989 | Adamson. | |
| 4,972,766 | 11/1990 | Anetsberger | 99/332 |
| 5,070,775 | 12/1991 | Blake | 99/422 X |
| 5,132,914 | 7/1992 | Cahlander et al. | |
| 5,172,328 | 12/1992 | Cahlander et al. | |
| 5,197,377 | 3/1993 | Jennings et al. | 99/349 |
| 5,341,727 | 8/1994 | Dickson. | |
| 5,376,395 | 12/1994 | Pels. | |
| 5,423,253 | 6/1995 | Olson et al. | 99/351 |
| 5,467,693 | 11/1995 | Van den Berghe. | |
| 5,513,538 | 5/1996 | Erickson et al. | 99/331 X |
| 5,531,155 | 7/1996 | Pellicane et al. | |
| 5,570,625 | 11/1996 | Liebermann | 99/330 |
| 5,640,895 | 6/1997 | Anetsberger | 99/349 |

OTHER PUBLICATIONS

Patent Application for Two Sided Cooking Apparatus Having Laser–Etched Platen; Inventor Robert K. Newton; Attorney Docket No. 52848–109, Apr. 21, 1997.

*Primary Examiner*—Timothy F. Simone
*Attorney, Agent, or Firm*—Foley & Lardner

[57] ABSTRACT

A clamshell or two-sided cooking system utilizes an upper platen and a lower platen. The upper platen is movable to a non cook and to a cook position. In the cook position, the upper platen is separated from the lower platen by a gap. The gap can be electronically adjusted for various thicknesses of foodstuffs. Preferably, an electronic adjustment mechanism is located within the upper platen assembly. The adjustment mechanism utilizes a drive means which inherently provides float to accommodate variations in thicknesses of the foodstuffs.

20 Claims, 2 Drawing Sheets

TWO-SIDED COOKING APPARATUS HAVING AN ELECTRONIC GAP ADJUSTMENT MECHANISM

FIELD OF THE INVENTION

The present invention relates generally to a cooking apparatus. More particularly, the present invention is a two-sided cooking apparatus or clamshell cooking system.

BACKGROUND OF THE INVENTION

Two-sided cooking apparatus or clamshell cooking systems are capable of simultaneously cooking two sides of various food products, such as, hamburger patties, sausage patties, chicken, or other foodstuffs. Clamshell cooking systems are often utilized in the fast-food industry because they reduce the overall cooking time associated with the foodstuffs, such as, frozen hamburger patties, and the amount of operator attention required for cooking the foodstuffs.

The clamshell cooking system generally includes an upper cooking plate or platen and a lower cooking plate or platen. The upper cooking platen is coupled to a platen support arm for swinging movement between a lower cooking position overlying the lower cooking platen and a raised position inclined upwardly from the lower cooking platen. The upper cooking platen can be manually or automatically moved between the lower cooking position and the raised position.

When the upper cooking platen is in the lower cooking position, it overlies the lower cooking platen and is separated from the lower cooking platen by a gap. The gap is generally set to a distance associated with the thickness of the foodstuff which is being cooked. The gap can be manually or automatically adjusted so that the foodstuff is appropriately cooked between the upper cooking platen and the lower cooking platen.

The gap between the upper cooking platen and the lower cooking platen must be set to accommodate the particular size or thickness of the foodstuff, such as, a hamburger patty, being cooked. For example, hamburger patties are preformed in several different nominal sizes (a quarter pound patty has a larger thickness than a regular patty).

Additionally, the gap must be adjusted during the cooking operation to accommodate the decrease in size of the hamburger patty as it is cooked. Hamburger patties are generally frozen for storage and transportation. The frozen patties are relatively rigid when initially placed on the lower cooking platen, and, if the upper cooking platen rests only on the thickest patty or patties, even small differences in the thickness of the patties in the group being cooked could delay good heat-transmitting contact between the upper platen and some of the thinner patties. Poor heat transmission results in uneven cooking of the patties. Further, the patties often soften and shrink or decrease in thickness as they thaw and cook. The gap must accommodate this change in thickness during the cooking operation.

Further still, the gap must be set so that the hamburger patty is protected from the weight of the upper cooking platen. If the weight of the upper cooking platen is unrestrained or uncontrolled, the upper cooking platen could excessively compress or compact the hamburger patties and adversely affect the texture and appearance of the cooked patties.

Thus, clamshell cooking systems present several special problems related to the adjustment of the gap between the upper and lower cooking platens. These problems include accommodating variations in initial thickness of the individual patties in the group being cooked, accommodating the decrease in thickness of the patties that occurs during cooking, preventing excess compaction of the patties, and accommodating different groups of patties of nominally different thicknesses.

Heretofore, clamshell cooking systems have relied on gravity to force the upper cooking platen onto groups of patties on the lower platen. Platen stops also can be provided to control the minimum spacing (the smallest acceptable spacing or gap) between the upper platen and the lower platen during cooking, thereby preventing excessive compaction of the cooked patties. The platen stops generally had to be manually manipulated to adjust the size of the gap between the upper cooking platen and the lower cooking platen. The use of manually manipulated stop pins is disadvantageous because the stop pins reduce the usable cooking area on the upper and lower platens and make it difficult to clean the upper platen. Further, stop pins which are near or in the cooking area are susceptible to grease and other debris which tended to bake onto the stop pins and to impede their adjustment. Further still, the manual adjustment of the gap can lead to operator error, particularly where several knobs have to be adjusted on a single platen.

In another prior system, the gap can be automatically set by adjusting a cam coupled to the platen support arm. However, the cam and mechanical linkages are exposed to grease and other debris which can impede the adjustment of the gap. Also, the cam is not capable of providing the necessary float to accommodate the variations in thicknesses of patties. Spring-loaded stop pins similar to the pins discussed above are required to provide the necessary float.

Thus, there is a need for a two-sided cooking system which includes an automated gap adjustment mechanism. Further, there is a need for an automatic gap adjustment system which does not rely on stop pins to provide float.

SUMMARY OF THE INVENTION

The present invention is related to a two-sided cooking system including a support structure, a lower cooking platen assembly, a platen support arm, an upper cooking platen assembly, and an electronic gap adjustment assembly. The lower cooking platen assembly has a top cooking surface and is attached to the support structure. The platen support arm is mounted on the support structure and is movable to a first position and a second position. The upper cooking platen assembly is coupled to the platen support arm and has a bottom cooking surface. The top cooking surface and the bottom cooking surface are separated by a gap when the platen support arm is in the first position. The electronic gap adjustment assembly is coupled to the upper platen assembly and adjusts the gap between the top cooking surface and the bottom cooking surface. The adjustment assembly includes a belt drive system, which provides limited floating of the top cooking surface with respect to the bottom cooking surface.

The present invention further relates to a clamshell cooking apparatus including a lower cooking platen and an upper cooking platen assembly. The lower cooking platen has a top cooking surface. The upper cooking platen assembly is disposed above the lower cooking platen. The upper cooking platen assembly includes an upper cooking platen having a bottom cooking surface. The upper cooking platen assembly is movable to a lower cooking position and to an upper raised position. The top cooking surface and the bottom cooking surface are separated by a gap when the upper platen assembly is in the lower cooking position. The upper cooking platen assembly includes an electronic gap adjustment means for adjusting the gap between the top cooking surface and the bottom cooking surface. The gap adjustment means provides limited floating of the top cooking surface with respect to the bottom cooking surface.

The present invention even further relates to an improved clamshell cooking apparatus including an upper cooking plate and a lower cooking plate. The upper cooking plate is movable to an upper position and to a lower cooking position. When in the lower cooking position, the upper cooking plate is separated from the lower cooking plate by a gap. The improvement includes an electronic gap adjustment mechanism coupled to the upper cooking plate. The electronic gap adjustment mechanism adjusts the gap between the upper cooking plate and the lower cooking plate. The electronic gap adjustment mechanism includes a stop, a drive system, and a motor. The stop is driven by the drive mechanism to particular positions to define the gap. The drive mechanism is driven by the motor and allows the stop to float so that the gap can change during cooking operations.

According to one exemplary aspect of the present invention, a gap adjustment mechanism for an upper cooking platen assembly in a clamshell cooking apparatus includes a belt, a stop, and a motor which drives a cam. The inherent flexibility associated with the belt provides float to accommodate minor adjustments to small differences in thicknesses of foodstuffs and to decreasing thicknesses of foodstuffs as they thaw and cook. The belt allows an appropriate amount of pressure to be exerted on the foodstuff located between the upper cooking platen and the lower cooking platen.

According to another exemplary aspect of the present invention, a stepper motor drives the belt drive system to a number of positions which are associated with particular gap sizes. The stepper motor and belt drive system are capable of reaching precisions of thousandths of an inch. Preferably, a user chooses a particular gap thickness for a particular type of foodstuff by selecting a key on a key pad. The electronic interface reduces operator error associated with manual mechanical adjustments of stop pins.

In accordance with yet another aspect of the present invention, the stepper motor is located in the upper platen assembly, thereby eliminating mechanical couplings for gap adjustment between the upper platen assembly and the support structure of the two-sided cooking system. In this way, only wires are required to be coupled into the upper platen assembly, rather than mechanical linkages which are susceptible to grease and other debris associated with the cooking operation. The stepper motor drives a belt which positions a stop. The stop is coupled to the upper platen assembly and contacts the lower platen.

BRIEF DESCRIPTION OF THE DRAWINGS

The exemplary embodiments of the present invention will hereafter be described with reference to the accompanying drawings, wherein like numerals denote like elements.

DETAILED DESCRIPTION OF THE PREFERRED EMBODIMENTS

Figure 1:
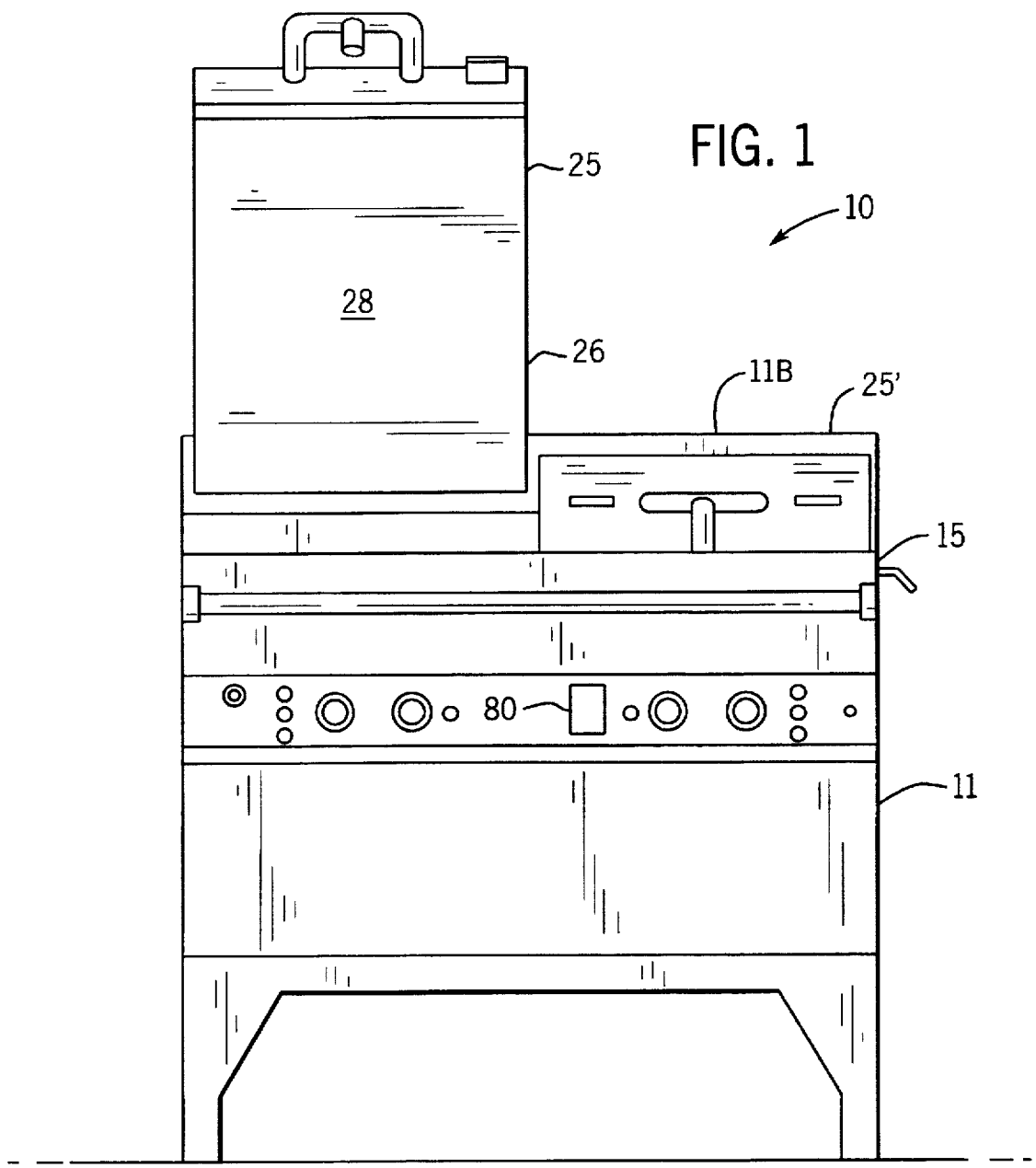
FIG. 1 is a front view of the cooking apparatus having dual upper cooking platen assemblies, with one upper cooking platen in a raised cooking position and the other upper cooking platen in a lower cooking position.
Figure 2:
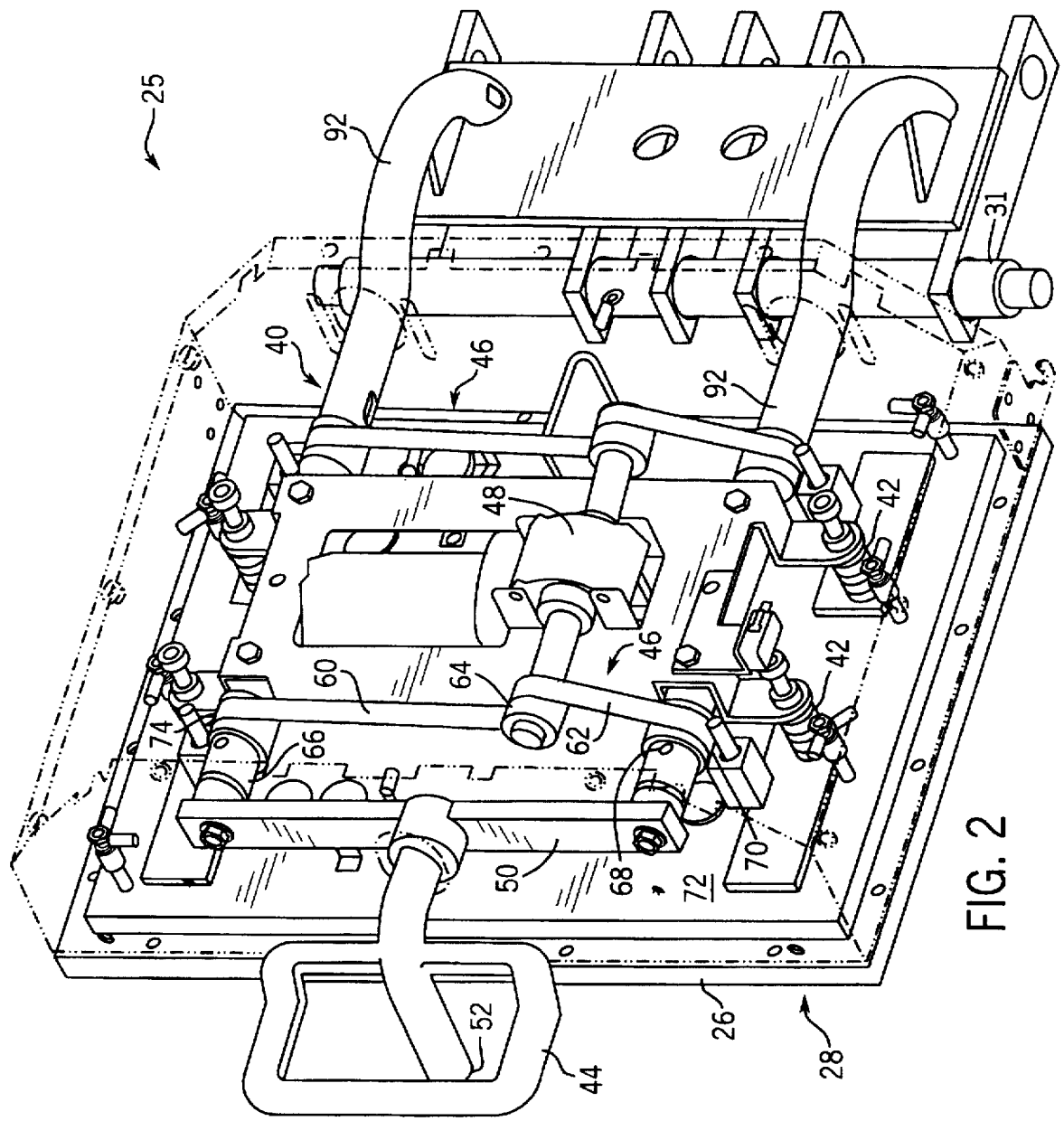
FIG. 2 is a perspective cut-away view of one of the upper cooking platen assemblies illustrated in FIG. 1 in accordance with an exemplary embodiment of the present invention.

With reference to FIGS. 1 and 2, a two-sided cooking system or clamshell grill apparatus 10 includes a ridged support structure 11 having a front 11A and a rear 11B. Structure 11 supports a lower cooking platen 15 formed of a heat-conducting material, such as, a steel plate. Platen 15 can be manufactured from cast aluminum, abrasion-resistant steel, cast iron, stainless steel, mild steel, a ceramic material, a metal material, or other strong heat-conducting medium. Platen 15 is preferably ¾ of an inch thick, 38 inches wide, and 24 inches deep. Although platen 15 is shown having a rectangular shape, platen 15 can be a variety of shapes and dimensions.

With reference to FIG. 1, two movable upper cooking platen assemblies 25 and 25' are disposed in a side-side relation, each having a width slightly less than one-half of the width of lower cooking platen 15. Upper cooking platen assemblies 25 and 25' are of like construction and of like numerals and are used to designate corresponding parts. Alternatively, a single upper cooking platen (not shown) assembly could be used, and platen assemblies 25 and 25' can take a variety of shapes.

Each of upper platen assemblies 25 and 25' includes an upper cooking platen 26 formed of heat-conducting material, such as, a cast aluminum plate. Each of upper cooking platen 26 includes a flat, smooth cooking surface at an underside or bottom cooking surface 28 that communicates with heating elements (not shown). Platen 26 is rectangular, has a width of 16.5 inches, and has a depth of 13 inches. Furthermore, platen 26 can be made of materials similar to platen 15. The materials, shapes, and dimensions associated with upper platen 26 and with lower platen 15 are not given in a limiting fashion. Any type of appropriate heating surface can be utilized.

Platen assemblies 25 and 25' are each mounted on a ridged platen support arm 31 (FIG. 2) for swaying movement about an axis between a lower cooking position (assembly 25' in FIG. 1) and an upper cooking position (assembly 25 in FIG. 1). Support arm 31 is coupled to structure 11. Alternative support arms can be utilized. For example, swivels, pivots, automated systems, or other devices can be utilized to raise and to lower upper platen assemblies 25 and 25' to raised and cook positions.

With reference to FIG. 2, platen assembly 25 is pivotally mounted to structure 11 via platen support arm 31. Platen assembly 25 includes upper cooking platen 26, a support structure 40, and spring mechanisms 42. Support structure 40 includes a handle or stop abutment 44, a belt drive mechanism 46, a stepper motor 48, and a frame 50. Frame 50 of support structure 40 maintains a relationship between drive mechanism 46, stepper motor 48, and abutment 44. Abutment 44 and motor 48 are fixed to frame 50. Drive mechanism 46 engages motor 48 and is in flexible engagement with frame 50.

Abutment 44 preferably has an end 52 which rests on an upper cooking surface of lower platen 15 when assembly 25 is in the lower cooking position. Abutment 44 provides a mechanical stop which defines a gap between upper cooking platen 26 and lower cooking platen 15 when assembly 25 is in the lower cooking position. End 52 of abutment 44 extends beyond surface 28 of platen 26 by the distance defined by the position of motor 48 which is the minimal acceptable gap distance for the particular setting.

Belt drive system 46 includes a belt 60, a belt 62, a cam 64, a rotational bearing 66, and a rotational bearing 68.

Bearings 66 and 68 are coupled to frame 50. Belt 62 has an end 70 fixed to a platen support 72, which is fixed to platen 26. Similarly, belt 60 has an end 74 fixed to platen support 72, which is fixed to platen 26. Therefore, belts 60 and 62 of system 46 are linked to support structure 40 by cam 64 and by motor 48 and are further linked to platen 26 by platen support 72. Additionally, platen support 72 is linked to support 40 by spring mechanisms 42. Spring mechanisms 42 are preferably biased outwardly to push support 40 away from platen support 72.

Drive mechanism 46 moves abutment 44 with respect to platen support 72 to define the gap between upper platen 26 and lower platen 15. Drive system 46 adjusts the distance associated with the gap by turning cam 64 to preselected positions. As cam 64 is turned counter clockwise when viewed from the end of assembly 25 associated with stop 44, belts 60 and 62 pull platen support 72 closer towards structure 40, thereby widening the gap between end 52 of abutment 44 and platen 26 (e.g., widening the gap between platen 26 and platen 15). When motor 48 turns cam 64 clockwise, belts 60 and 62 allow platen support 72 to be further separated from structure 40, thereby narrowing the gap between platen 26 and platen 15. Gravity and spring mechanisms 42 assure that platen support 72 is fully separated from support 40 to the distance set by the position of cam 64. Cam 64 preferably has a generally circular shape with two flat sides in order to more precisely position abutment 44.

Belts 60 and 62 preferably do not require lubrication and are durable non stretching ribbons of steel. Alternatively, belts 60 and 62 can be kevlar fibers, links, cables, chains, or other belt structures. Belts 60 and 62 preferably provide an inherent float (slight flexing) which allows for the gap to be inherently adjusted for minor differences in thicknesses of foodstuffs, such as, hamburger patties. Further, the float allows the gap to accommodate the changing size of the hamburger patty as it is cooked. Thus, mechanism 46 does not require spring-loaded stops to provide the necessary float for cooking operations.

Drive mechanism 46 and motor 48 are advantageously located within upper platen assembly 25, so mechanical links do not have to be made from structure 11 to upper platen assembly 25. Preferably, only electronic cables need to be provided to a user interface 80 (FIG. 1) for setting the appropriate gap. Stepper motor 48 is preferably microprocessor controlled and provides precision positioning of cam 64. Cables from interface 80 are preferably provided through tubes 92 of structure 40.

Drive mechanism 46 is preferably coupled at four points near corners of platen 26. Motor 48 is situated between a set of belts and includes two cams coupled to each set.

An operator using interface 80, which is preferably a key pad, presses buttons to select individual gap settings for system 10. For example, the user can select a gap setting for a thick hamburger, a thin hamburger, or other foods. Additionally, a reset or home setting is preferably provided where platens 26 and 15 are separated to a maximum gap distance. Preferably, every time assemblies 25 and 25' are brought to the cooking position or the gap distance is changed via interface 80, system 10 separates platens 26 and 15 to the maximum gap distance (home position). After the home position is reached, platens 26 and 15 are brought closer together in accordance with the selection made on interface 80. In this way, motor 48 and system 10 are ensured that previous positioning errors are not duplicated by moving from one selected position to another selected position without first resetting to the home position. Preferably, upon loss of power, motor 48 automatically resets to the home position, thereby preventing assemblies 25 and 25' from being locked in a lower gap setting in the event of a malfunction.

It is understood that, while the detailed drawings, specific examples, and particular component values given provide a preferred exemplary embodiment of the present invention, it is for the purpose of illustration only. The apparatus of the invention is not limited to the precise details and conditions disclosed. Further, although a particular clamshell-type cooking apparatus is shown, other cooking apparatuses using an upper and a lower plate could utilize the adjustment mechanism of the present invention. Various changes may be made to the details disclosed without departing from the spirit of the invention which is defined by the following claims.

What is claimed is:

1. A two-sided cooking system, comprising:

a support structure;

a lower cooking platen assembly having a top cooking surface, the lower cooking platen assembly being attached to the support structure;

a platen support arm pivotally mounted on the support structure, the platen support arm being movable to a first position and a second position;

an upper cooking platen assembly coupled to the platen support arm and having a bottom cooking surface, the top cooking surface and the bottom cooking surface being separated by a gap when the platen support arm is in the first position; and an electronic gap adjustment assembly coupled to the upper platen assembly, the electronic gap adjustment assembly adjusting the gap between the top cooking surface and the bottom cooking surface, the electronic gap adjustment assembly including a belt drive system, whereby the belt drive system provides limited floating of the top cooking surface with respect to the bottom cooking surface.

2. The two-sided cooking system of claim 1, wherein the adjustment assembly is located within the upper cooking platen assembly.

3. The two-sided cooking system of claim 2, wherein the adjustment assembly includes a stepper motor.

4. The two-sided cooking system of claim 3, wherein the belt drive system includes a plurality of cams coupled to a plurality of belts.

5. The two-sided cooking system of claim 4, wherein the adjustment assembly includes a stop abutment coupled to the belt drive system, the stop abutment being in contact with the top cooking surface when the platen support arm is in the first position, wherein the belt drive system moves the stop abutment to adjust the gap.

6. The two-sided cooking system of claim 5, wherein the adjustment assembly includes a plurality of spring mechanisms, the spring mechanisms being fixed between the belt drive system and the bottom cooking surface.

7. A clamshell cooking apparatus, comprising:

a lower cooking platen having a top cooking surface;

an upper cooking platen assembly disposed above the lower cooking platen, the upper cooking platen assembly including an upper cooking platen having a bottom cooking surface, the upper cooking platen assembly being movable to a lower cooking position and to an upper raised position, the top cooking surface and the bottom cooking surface being separated by a gap when the upper platen assembly is in the lower cooking position, and wherein the upper cooking platen assembly includes an electronic gap adjustment means for adjusting the gap between the top cooking surface and the bottom cooking surface, whereby the gap adjustment means provides limited floating of the top cooking surface with respect to the bottom cooking surface.

8. The clamshell cooking apparatus of claim 7, wherein the gap adjustment means includes a belt assembly located within the upper cooking platen assembly.

9. The clamshell cooking apparatus of claim 8, wherein the belt assembly includes a chain, belt, cable, band, or cord.

10. The clamshell cooking apparatus of claim 8, wherein the belt assembly includes a plurality of cams coupled to a plurality of belts.

11. The clamshell cooking apparatus of claim 7, wherein the gap adjustment means includes a stepper motor.

12. The clamshell cooking apparatus of claim 7, wherein the gap adjustment means includes a stop abutment, the stop abutment being in contact with the top cooking surface when the upper platen assembly is in the lower cooking position, and wherein the adjustment means moves the stop abutment to adjust the gap.

13. The clamshell cooking apparatus of claim 12, wherein the gap adjustment means includes a plurality of spring mechanisms, the spring mechanisms being fixed between a belt drive system and the upper cooking platen.

14. The clamshell cooking apparatus of claim 10, wherein at least one of the cams is generally circular with a plurality of flat sides.

15. The clamshell cooking apparatus of claim 8, wherein the belt assembly includes a plurality of belts, each belt being coupled to a cam and to a fixed position on the upper cooking platen.

16. A clamshell cooking apparatus including an upper cooking plate and a lower cooking plate, the upper cooking plate being movable to an upper position and a lower cooking position, the upper cooking plate being separated from the lower cooking plate by a gap when in the lower cooking position, the improvement comprising:

an electronic gap adjustment mechanism coupled to the upper cooking plate, the electronic gap adjustment mechanism adjusting the gap between the upper cooking plate and the lower cooking plate, the electronic gap adjustment mechanism including a stop, a drive mechanism, and a motor, wherein the stop is driven by the drive mechanism to particular positions to define the gap, wherein the drive mechanism is driven by the motor, wherein the drive mechanism allows the stop to float so the gap can change during cooking operations.

17. The clamshell cooking apparatus of claim 16, wherein the drive mechanism includes a chain, belt, cable, band, or cord.

18. The clamshell cooking apparatus of claim 17, wherein the stop is in contact with the lower cooking plate when the upper cooking plate is in the lower cooking position.

19. The clamshell cooking apparatus of claim 18, wherein the gap adjustment mechanism includes a plurality of spring mechanisms, the spring mechanisms being mechanically coupled between the stop and the upper cooking plate.

20. The clamshell apparatus of claim 16, wherein the drive mechanism includes a first belt coupled between a cam and a first point on the upper cooking plate and a second belt coupled between the cam and a second point on the upper cooking plate, the first point being on a first side, the second point being on a second side, and the cam being between the first point and the second point.

* * * * *